Nov. 1, 1955
J. A. L. LABEYRIE
2,722,427
MACHINE-TOOL CHUCKS
Filed Nov. 26, 1951
4 Sheets-Sheet 1
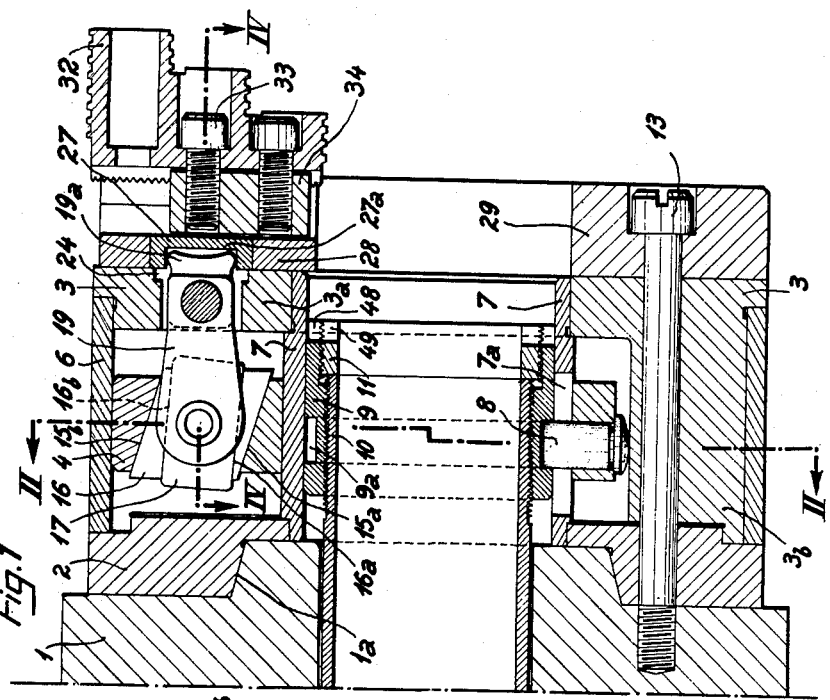

Nov. 1, 1955    J. A. L. LABEYRIE    2,722,427
MACHINE-TOOL CHUCKS
Filed Nov. 26, 1951    4 Sheets-Sheet 2
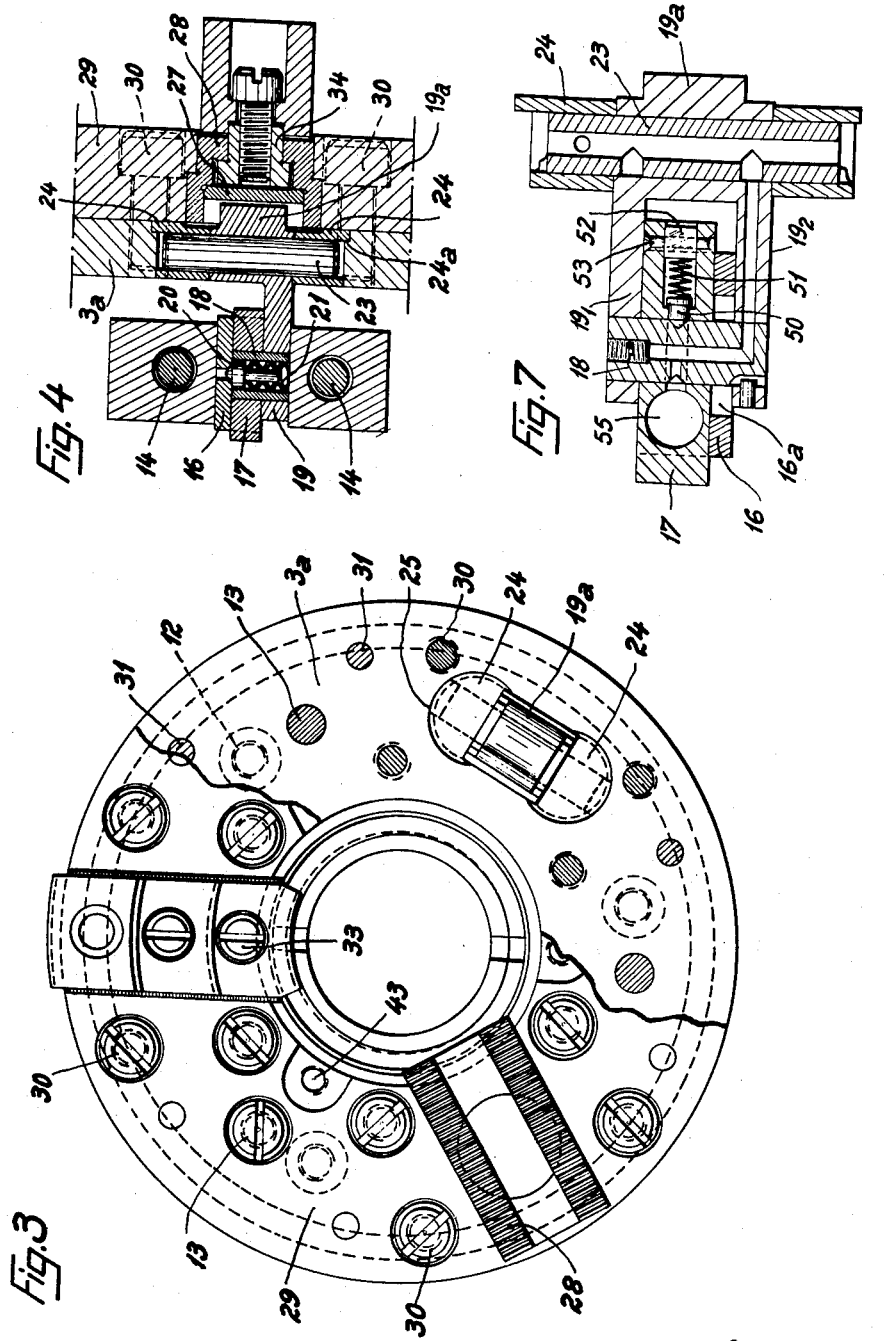

Nov. 1, 1955
J. A. L. LABEYRIE
2,722,427
MACHINE-TOOL CHUCKS
Filed Nov. 26, 1951
4 Sheets-Sheet 3
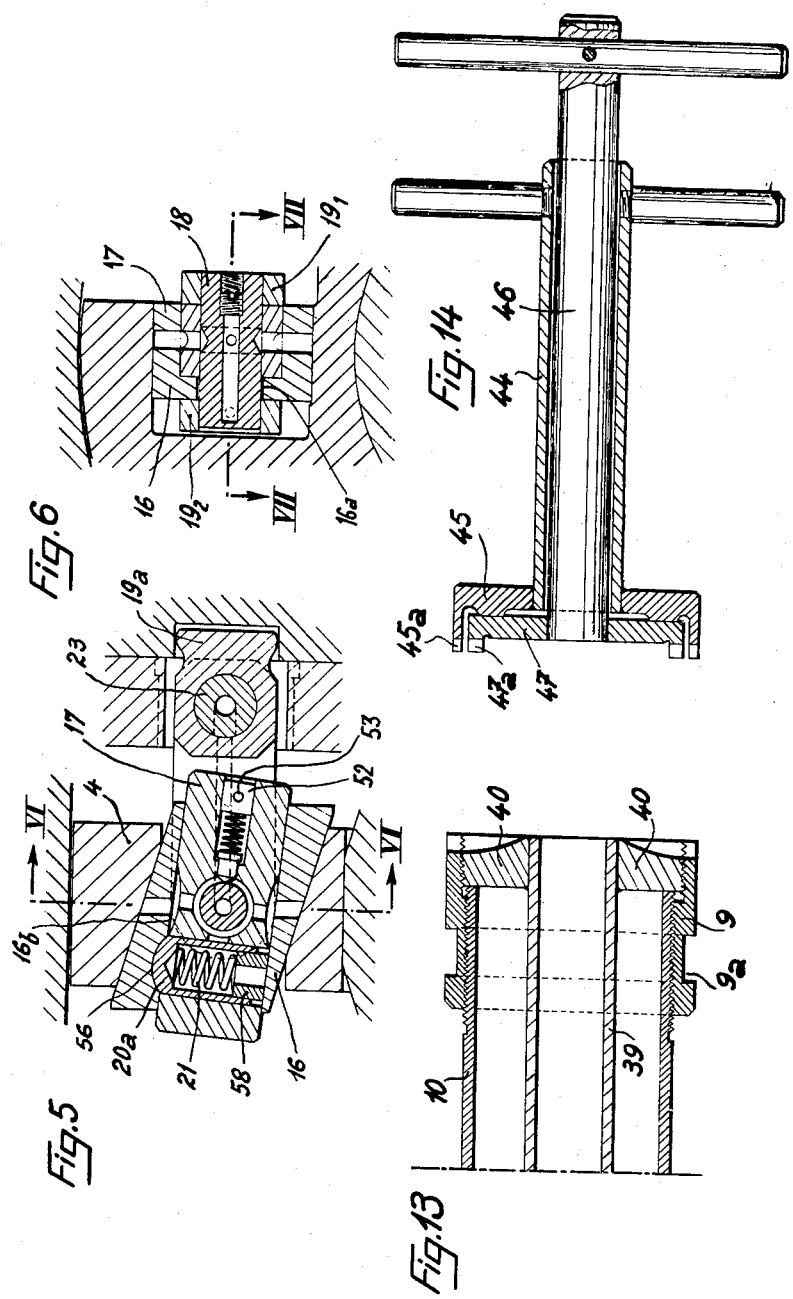

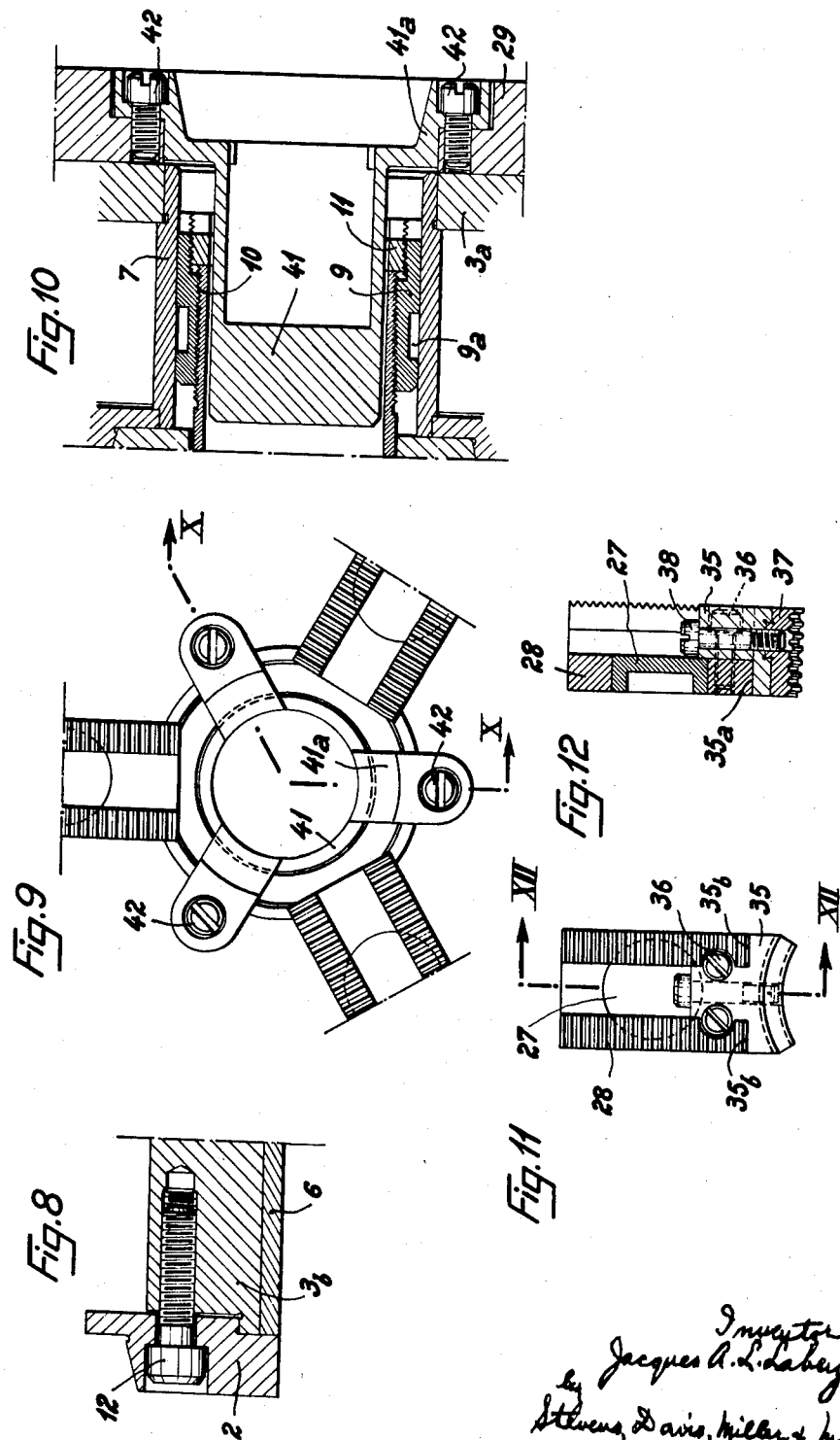

United States Patent Office 2,722,427
Patented Nov. 1, 1955

2,722,427

MACHINE-TOOL CHUCKS

Jacques A. L. Labeyrie, Courbevoie, France

Application November 26, 1951, Serial No. 258,107

Claims priority, application France November 28, 1950

9 Claims. (Cl. 279—119)

This invention relates to chucks for machine-tools, and more particularly to workpiece carrying chucks capable of being actuated to engage and disengage a workpiece during operation of the machine-tool. The use of chucks of this kind is an essential requisite if high production rates are to be obtained on machine tools in order to prevent the occurrence of unproductive idle periods. Their use moreover eliminates the considerable amounts of power required by re-starting the electric drive motor of the machine.

Known types of chucks operable without stopping the machine tool possess a number of drawbacks. They are usually of intricate construction. They exert considerable reaction thrusts upon the spindle of the machine tool. Moreover, they are not generally suitable for machining workpieces in bar or strip form owing to the fact that their actuating mechanism being disposed axially of the chuck, obstructs the axial duct through the spindle. Furthermore, in known chucks of this kind, the revolving mass is very high, thereby adding to the weight of the spindle and increasing wear.

Certain types of conventional chucks, operated with pressure fluid such as air, unavoidably involve imperfect seals at the rotating parts, thus incurring excessive losses of pressure fluid.

Moreover, known chucks operable in the operation of the machine are usually of the clamping type, so that they are only capable of engaging workpieces having a narrow range of diameter tolerance; they are thus only capable of receiving machined workpieces and not crude forgings or castings.

It is an object of this invention to provide an improved machine tool chuck capable of being actuated for engaging and releasing a workpiece therein and therefrom during operation of the machine, which is both simple and reliable.

Another object is to provide such a chuck which will not exert substantial axial forces on the machine tool spindle.

A further object is to provide such an improved chuck which is adapted for handling workpieces in the form of continuous strips or bars.

Further objects include the provision of such a chuck which is lightweight, which does not consume much auxiliary power for the engagement and disengagement of a workpiece therein, and which will be capable of reliably engaging workpieces within a wide range of dimensional tolerance, such as crude forgings, castings and the like.

According to the invention, an improved machine-tool chuck of the type described comprises an axially displaceable member or spider formed with at least one camming surface or incline extending generally axially of the chuck, and adapted to be engaged by a slider element pivotally supported from one end of a lever, said lever being pivoted at an intermediate point thrust about an axis fixed with respect to and extending transversely of the chuck assembly and having its other end cooperating with a clamping member movable radially of the chuck for clamping a workpiece therein. Thus, axial displacement of the spider will result, through the camming action of said incline upon the slider, in a radial rocking movement of the lever and a consequent radial displacement of the clamping member.

Preferably, provision is made for radially displacing the clamping member or members in both directions, i. e. both inwardly and outwardly, and for this purpose the axially displaceable member or spider is formed with a cut out presenting two opposite parallel spaced camming inclines directed towards each other and both extending generally axially of the chuck assembly, the slider being adapted to ride in between the two inclines. In this way, one of the camming inclines is operative on movement of the spider in one direction, and the other is operative during movement in the other direction, whereby a workpiece may be clamped by action on either its radially inner or outer surface as may be found convenient. This reversible arrangement further provides for the automatic return of the levers to their original positions about their pivots on release of the workpiece.

For a given amount of displacement of the axially displaceable member or spider, the amplitude of the radial displacement of the clamping obviously depends, in the first place, on the ratio between the lever arms, and in the second place on the angle of the inclines with respect to the axis of the chuck. If this angle is large, the amplitude of displacement of the clamps will be large while the clamping force resulting from a given axial pressure exerted on the axially displaceable member will be correspondingly low. If on the other hand said angle is small, the clamping force may be made considerable, whereas the radial displacement of the clamps will be much smaller. In all circumstances, it is desirable to select an angle for the incline such that it will be less than the angle of friction, so that the slider, once it has been clamped, will remain blocked frictionally against the incline and it will not be necessary to maintain the pressure exerted on the axially displaceable member. Thus, the spindle will not have to be subjected to a permanent axial thrust.

In order to reconcile the necessity of providing a comparatively large radial displacement of the clamps with a high clamping pressure at the end of the displacement of the spider, the slider supported on the lever is preferably made in two parts, including one part formed with a highly inclined surface adapted to cooperate directly with the incline of the spider, and another part formed with a less greatly inclined surface, pivoted to the lever and slidable within the first part, means being provided for resiliently urging the two parts to a centered position with respect to each other.

Thus, as the axially displaceable member or spider is moved axially for clamping a workpiece, the clamps will be quickly moved towards the workpiece surface because, at that time, it is the first, steeply inclined, part which is riding on the camming surface. After the clamps have engaged the workpiece, however, the force resulting from the pressure exerted on the spider will overpower the resilient centering means of the two parts of the slider, causing the second part to slide with respect to the first and thereby exert the requisite high clamping force. The clamping force is thereafter maintained owing to the camming action of the two slider parts one within the other and of both parts bodily against the steep camming incline of the spider. During the reverse or disengaging movement, the blocking action will first be removed from the steeper incline, whereupon the second slider part is released and the resilient centering means act to restore said second part to its intermediate or centered position with respect to the first.

Preferably and for obvious reasons of symmetry, a plurality of (for example three) such slides and lever combinations are provided, each slider riding on a related camming incline or pair of inclines and cooperating with a related one of the clamping members of the chuck, said inclines or pairs of inclines being formed in angularly equispaced relation about the axis of the spider.

An illustrative embodiment of the invention will now be described in detail with reference to the accompanying drawings wherein:

Fig. 1 is a substantially axial section of the chuck structure,

Fig. 2 is a cross-section on line II—II of Fig. 1, with parts broken away and others removed, Fig. 3 is a front elevation of the chuck, with parts removed, Fig. 4 is a partial section on line IV—IV of Fig. 1, Fig. 5 illustrates a modified form of lever and slider combination, in section on a plane passing through the axis of the chuck, Fig. 6 is a section on line VI—VI of Fig. 5, Fig. 7 is a section on VII—VII of Fig. 6, Fig. 8 is a section on VIII—VIII of Fig. 2, Fig. 9 is a simplified front view of the chuck showing the provision of an axial stop therein, Fig. 10 is a section on X—X of Fig. 9, Fig. 11 shows a detail of a clamping member with which the chuck may be provided.

Fig. 12 is a section on XII—XII of Fig. 11,

Fig. 13 is an axial section of the central part of the chuck, internally provided with a bar-guide tube therein, Fig. 14 is in part an elevation and in part a section showing a key suitable for adjusting the chuck.

As generally shown in Figs. 1, 2 and 3, the chuck assembly is mounted on a tubular spindle 1 of a machine tool. The nose end of the spindle is formed in conventional manner with a taper boss 1a projecting into a complementary socket formed in a disc-like member 2 which forms the rear end wall of the chuck body. The chuck body generally designated 3, is an integral machined element and comprises at its other or forward end a front wall part 3a similar in shape and size to the rear wall member 2. Extending rearwardly from the front wall 3a of the chuck member are three circumferentially equispaced portions 3b the rear ends of which engage a peripheral shoulder of the rear end wall 2. The Y-shaped space defined by the portions 3b, which space opens rearwardly of the chuck body, houses an axially displaceable member or spider 4, of complementary Y-shaped form, having its three equispaced branches slidably cooperating with smooth sliding surfaces 5 formed on the sides of each of the portions 3b.

The chuck is surrounded and peripherally sealed by a cylindrical ring 6 engaging the rear and front end discs 2 and 3a to be retained thereby upon assembly thereof. Similarly the internal periphery of the chuck is sealed by an inner ring 7. Inner ring 7 is formed with three angularly equispaced axially elongated apertures 7a through which fingers 8 extend, said fingers being snugly retained in holes formed in axially displaceable member or spider 4. The inner ends of fingers 8 project into an annular groove 9a formed in a threaded bushing 9 slidable within inner ring 7. Screwed into the threaded inner periphery of the bushing 9 is one end of a tube 10 blocked in position by a lock-nut 11. Tube 10 is rotatable with the machine tool spindle, and extends completely through the full extent of said spindle, being axially actuatable by any suitable means from its left hand end, not shown. Preferably, such actuating means are arranged to engage the outer periphery of tube 10 in order to leave the inner cavity of the spindle unobstructed. When axially displaced, tube 10 carries bushing 9 with it, and the bushing in turn acts through fingers 8 to cause an axial displacement of spider member 4.

The above described assembly is retained in assembled condition with screws 12 (see Fig. 8) serving to attach rear end plate 2 to body portions 3b and the chuck is secured to the nose of the spindle by screws 13 extending through said body portions and projecting into the front end surface of the spindle.

Each branch of the Y-shaped spider member 4 is in two parts assembled together with screws 14. Each of said branches is formed with a cut out 15 rectangular in transverse cross-section and having its radially inward and outward sides 15a and 15b forming camming inclines and extending parallel to each other and at an angle to the general axis of the chuck assembly. Slidable in each cut out 15 is a slider or cam-follower element 16. The sliders 16 may be termed the primary sliders. As shown (Fig. 2) the cross sectional configuration of each primary slider 16 is channel-shaped, the inner faces of the sides or flanges of the channel constituting parallel inclined planes 16a and 16b forming camming inclines and extending at an angle with respect to the general axis which is less than the angle formed between said axis and the aforementioned surfaces or inclines 15a and 15b. Slidable within the channel recess of each primary slider 16 is a secondary slider or cam follower element 17, to which a lever 19 is pivoted by means of a tubular pivot pin 18. A taper ended plunger pin 20 is slidable in each tubular pin 18 axially thereof, and is normally urged by biassing spring means 21 (herein shown as a stack of spring-washers) to a position in which the taper end of the plunger engages a complementary socket 22 formed in slider 16.

In the modified construction shown in Figs. 5, 6 and 7, the above mentioned lever is of a somewhat different form. As shown, said lever, is formed from two spaced elements 19₁ and 19₂ surrounding the sliders 16 and 17. The primary slider 16 is formed with an elongated aperture 16a through which pin 18 extends whereby relative motion is possible between sliders 16 and 17. Axial displacements of pin 18 are prevented by a stop finger 50 biassed by a spring 51, said finger and spring being housed within the secondary slider 17, and the spring being retained therein by a plug 52 blocked by a cotter pin 53.

In this construction, the means for resiliently retaining sliders 16 and 17 in a central position with respect to each other is a finger 20a housed in a bore 55 formed within slider 17 in a direction at right angles to the sliding surfaces of sliders 16 and 17. The outer end of finger 20a projects into a depression 56 of sliding surface 16b of primary slider 16 and is urged thereinto by a spring 21 acting against a stop 58.

The function of finger 20a is the same as that of plunger 20 shown in Fig. 4. An advantage of the construction just described in connection with Figs. 5, 6 and 7 over that first disclosed lies in the symmetrical construction and arrangement of the lever 19 and of its pivotal attachment to the slider 16, whereby it will not tend to be subjected to twisting stresses as might be the case with lever 19 of Figs. 1 to 4. It may be noted that Figs. 5, 6 and 7 illustrate lubricating ducts for lubricating the pivot pin of lever 23, pin 18 and sliding surfaces of the primary and secondary sliders. Lubricant may be supplied into said ducts from a lubricator provided on the front end face of the chuck.

Returning to the general description of the device, lever 19 extends through the front wall portion 3a of the chuck body and is pivoted therein on a pin 23 supported on said part 3a. For this purpose the opposite ends of pin 23 extend into radial bores formed in two semi-circular inserts 24 fitted in bores 25 formed on opposite sides of the cut out 26 formed in the part 3a for passing lever 19 therethrough. The inserts 24 are provided with flanges 24a for securing them in position in part 3a.

The end 19a of lever 19 is of oblong rounded form and projects into a diametrically extending recess such as a saw-cut formed in an insert 27 fitted in a bore formed in the clamp or chuck-jaw carrier 28. The clamp or chuck-jaw carrier is slidably mounted on the front face of part 3a. The jaw carriers are guided in their radial displacement on said front face by means of segmental guide members 29 secured to the front face of the chuck. The guide segments 29 are secured with screws 30 and are centered by means of locating studs 31. The jaw carriers are formed with serrated front surfaces offset rearwardly with respect to the front face of the segments, and are adapted to mount jaws such as 32, e. g. of the stepped type, secured thereto with screws 33 engaging inserts 34 slidably mounted in T-shaped grooves formed in the jaw carriers.

As shown in Figs. 11 and 12, the jaw-carriers 28 may alternatively be arranged to receive clamps for handling workpieces that are small in diameter. Each jaw barrier receives in an inner groove at its end, a tenon projecting from a part 35, which part is further secured with screws 36 engaging complementary threaded apertures formed in said jaw carrier. The parts 35 are adapted to receive a set of clamps 37 of the desired diameter. Each clamp fitted into the free end of each of the parts 35 is secured by means of a bolt 39. As may be seen from Figs. 11 and 12, each part 35 is supported against the end of one of the jaw carriers both at the rear at 35a and at the sides at 35b. The securing means are in this way subjected to no substantial shear. When using jaw carriers arranged for the use of clamps as now described, the front face of the chuck is desirably provided with a cover flange applied over the guide segments 29 so that the front face of the chuck will have no projections therefrom liable to constitute a hazard for the operator during operation of the machine tool.

The operation of the improved chuck assembly will now be described.

When axial pressure is exerted rightwards (as shown in the drawings) on tube 10, as previously described the spider 4 will be displaced axially with respect to the main body of the chuck. This remains true whether the chuck is or is not rotating at the time.

Spider 4 in its displacement is effective, through cam surface 15, to produce a radially outward displacement of each slider 16, resulting in a clockwise rocking movement of the corresponding lever 19 about its pin 23 which in turn causes a radially inward movement of the related jaw carrier 28, thereby clamping the external periphery of a workpiece in the chuck.

Upon engagement of the clamping element, e. g. jaw 32, with the outer surface of the workpiece, increased resistance is opposed against the displacement of levers 19. Owing to the comparatively large angle of camming surface 15a with respect to the axis of the chuck, slider 16 is now unable to slide further over said surface and hence, on continued rightward pressure exerted upon the end of tube 10, spider 4 and slider 16 are simultaneously driven bodily rightwards relative to secondary slider 17 which latter is rigidly connected through pin 18 to lever 19. Because the angle of the camming surface 16a then acting on lever 19 is much smaller than the angle of surface 15, lever 16 is subjected to a much smaller radial displacement but with a much greater force. During this displacement, the plunger 20 (or finger 56 as the case may be) is forced by a small amount out of its socket formed in the slides 16, compressing its spring 21.

After this clamping action has been completed, the secondary slider or sliders 17 are in turn clamped in the sliders 16. The workpiece is now securely held in the chuck and can be machined.

To release the workpiece, force is exerted on tube 10 in the opposite direction, i. e. leftwards as shown. During this retraction of spider 4, slider 16 is first disengaged from its camming surface 15a, whereas slider 17 remains momentarily blocked or jammed in slider 16. It should further be noted that the opposite camming surface or incline 15b acts simultaneously to restore lever 19 to its original position. Thus, the provision of this opposite incline eliminates the necessity of using spring biassing means or the like for each of the levers 19. On release of primary slider 16, slider 17 becomes released from the said jamming action and spring 21 is allowed to expand and to restore plunger 20 into the recess of slider 16, thus restoring both sliders 16 and 17 to their original mutually centered relative position.

In the case that internal rather than external clamping is used, the operation would be similar except for the fact that the inclines 15b and 16b would successively act instead of inclines 15a and 16a. Moreover, the direction of displacement of tube 10 would of course be reversed. In this way a workpiece would be clamped by a radially outward movement of the clamps into engagement with the inner periphery thereof.

An advantage of the chuck assembly according to the invention as already pointed out, is that it leaves the axial cavity of the spindle unobstructed, whereby workpieces in the form of long bars may be continuously machined, said bars being arranged to extend through said axial cavity. If the said bars are of small diameter, means are preferably provided for guiding and centering them in the spindle cavity by a tube of appropriate diameter.

As shown in Fig. 13, such a guide tube 39 may be provided with a threaded ring 40 secured to the end thereof in place of the lock-nut 11 for blocking tube 10 within ring 9.

On the other hand, under different working conditions, it may be desirable to provide the chuck with an axial abutment for the workpiece, for example when discontinuous or intermittent machining cycles are to be performed. Such an abutment, as shown in Figs. 9 and 10, desirably consists of a blind tube element 41 provided with three ears 41a respectively secured with screws 42 in threaded holes provided for the purpose in segments 29 (Fig. 3). These threaded holes may also, when required, serve to attach the previously mentioned safety cover plate for concealing the forward end surface of the chuck. For adjusting the tube 10 in position with respect to ring 9, a tool in the form of the dual key shown in Fig. 14 may be used. The tool comprises a tube 44 having secured to one end thereof a flange 45 provided with teeth 45a adapted to engage castellations 48 formed on the protruding end of bushing 9, and a shank 46 extending through tube 44 and provided at its end adjacent flange 45 with a further flange 47 similarly provided with teeth 47a adapted to cooperate with the castellations of 49 of lock-nut 11 (or threaded ring 40). The position of bushing 9 is first determined by rotation of the tube 44, whereupon said tube may be held stationary by means of its handles shown and shank 46 acted on to block lock-nut 11.

It is to be understood that many alterations may be made in the constructional details of the particular chuck assembly illustrated and described without exceeding the scope of the invention.

What I claim is:

1. In a chuck for a machine tool having an axis of rotation, in combination clamping means movable radially of said axis and an operating member movable longitudinally of said axis, at least one lever pivoted on a fixed fulcrum spaced from and normal to said axis, an outer end of the lever engaging said clamping means for radial movement thereof on rocking movement of the lever, camming means on said member including a pair of opposite, spaced, substantially parallel inclines, and means pivoted to the inner end of the lever comprising a first slider element between said inclines and adapted to slide over same, said first slider element having a further pair of opposite, spaced, substantially parallel camming inclines formed thereon at an angle to said axis substantially different from that of said first inclines, a second slider element pivoted to the inner end of said lever between said further inclines and adapted to slide over same, and means yieldingly restraining relative movement between the smaller angle inclines and the slider element sliding between and over same.

2. In a clamping arrangement, in combination, a support having an axis, clamping means displaceable along a line perpendicular to said axis for clamping an object on said support, an operating member displaceable along a line parallel to said axis, a lever pivoted on a fixed fulcrum on said support substantially perpendicular to both said lines, an outer end of said lever engaging said clamping means for moving the same along said former-mentioned line upon rocking movement of the lever about its fulcrum, means on said member providing a first pair of opposite spaced, substantially parallel camming inclines forming an angle with said axis, a first slider element adapted to slide between said inclines and over same, means on said first slider providing a second pair of spaced, substantially parallel camming inclines forming an angle with said axis different from the former-mentioned angle, a second slider element pivoted to the inner end of the lever and adapted to slide between said second inclines and over same, said fulcrum being farther from said inner lever end than from said outer lever end, and means yieldingly restraining relative motion between said slider elements.

3. In a clamping arrangement in combination, a support having an axis, clamping means displaceable along a line perpendicular to said axis for clamping an object on said support, an operating member displaceable along a line parallel to said axis, a lever pivoted on a fixed fulcrum on said support substantially perpendicular to both said lines, an outer end of said lever engaging said clamping means for moving the same along said former-mentioned line upon rocking movement of the lever, means on said member providing a first pair of parallel spaced opposite camming inclines directed towards each other extending at a comparatively large angle with respect to said axis, a first U-shaped slider element having the outer surfaces of the sides of said U slidable over said opposite camming inclines, the inner surfaces of the sides of said U providing a second pair of parallel spaced opposite camming inclines directed towards each other and extending at a comparatively small angle with respect to said axis, a second slider element having opposite surfaces slidable over said second pair of inclines and pivoted to the inner end of said lever, said fulcrum being more distant from said inner than from said outer lever end, and means yieldingly restraining relative motion between said slider elements.

4. The combination claimed in claim 3, which further comprises a tubular pivot pin for pivoting said second slider element to said inner lever end, and said yielding restraining means comprise a plunger slidable within said tubular pivot, a depression in said first slider element, and spring means urging said plunger into yielding engagement with said depression.

5. The combination claimed in claim 3, wherein said lever comprises two spaced parts having said second slider element pivoted therebetween, and said yielding restraining means comprise a bore formed through said second slider element normally to said second incline, and a spring-urged plunger means in said bore urged into yielding engagement with a depression formed in said first element within said second incline thereof.

6. The combination claimed in claim 3, wherein said clamping means each comprises a rearwardly directed recess formed in its sliding surface, and said outer end of the lever is complementarily configured to project into said recess.

7. A chuck for a machine tool having a rotatable spindle, which comprises in combination, a chuck body securable to the forward end of said spindle and including an inner ring coaxial with said spindle and a forward radially extending end flange, a plurality of clamping means simultaneously movable on radial paths on the forward face of said flange, angularly equispaced projections extending from the rear face of said flange to surround said inner ring and defining between them a star-shaped cavity, an operating spider member mounted for non-rotatable axial sliding movement about said ring and having spider arms guidingly projecting into said star-shaped cavity, a plurality of levers pivoted to said flange on pivots spaced from and transverse to said spindle axis having outer ends projecting through said flange into engagement with respective ones of said clamping means, a plurality of camming incline means formed on said member, first slider elements slidably cooperating with said camming inclines and having further camming incline means thereon forming an angle with the spindle axis smaller than the angle formed therewith by said first mentioned camming inclines, and second slider elements pivoted to the inner ends of said levers and slidably cooperating with said further inclines, means resiliently restraining relative motion between said elements, a slot in said ring and axial displacement means connected through said slot with said spider for axially displacing said spider whereby said first elements will initially slide over said first inclines to rapidly rock said levers and move said clamping means by a substantial amount into engagement with an object to be clamped, whereupon said restraining means will be overpowered and said second elements will slide over said second inclines to rock said levers and move said clamping means by a small additional amount with increased force firmly to clamp said object.

8. In a chuck for a machine tool having a rotating spindle, in combination, a chuck body securable to said spindle coaxially therewith, clamping means movable radially of said body into and out of clamping engagement with an object to be clamped, an operating member movable axially of said body, levers pivoted on fixed fulcrums on said body transversely and spaced from said axis, the outer ends of said levers engaging said respective clamping means for radial movement thereof on rocking movement of said levers, first camming inclines formed on said member, first slider elements cooperating with said first inclines and having further camming inclines thereon forming a smaller angle with the spindle axis than with said first inclines, second slider elements slidably cooperating with said second inclines and pivoted to the inner ends of said levers, means yieldingly restraining motion between the first and second slider elements, and operating means for axially displacing said member whereby said first elements will initially slide over said first inclines to rock said levers and move said clamping means a substantial amount into engagement with an object to be clamped, whereupon said yielding means will yield and said second elements will then slide over said second inclines to rock said levers and move said clamping means by a small additional amount with increased force firmly to clamp said object.

9. In a chuck for a machine tool having an axis of rotation, in combination clamping means movable radially of said axis and an operating member movable longitudinally of said axis, at least one lever pivoted on a fixed fulcrum spaced from and normal to said axis, an outer end of the lever engaging said clamping means for radial movement thereof on rocking movement of the lever, camming means on said member including a pair of opposite, spaced, substantially parallel inclines, and means pivoted to the inner end of the lever comprising a first cam-follower element between said inclines and adapted to move over same, said first cam-follower element having a further pair of opposite, spaced, substantially parallel camming inclines formed thereon at an angle to said axis substantially different from that of said first inclines, a second cam-follower element pivoted to the inner end of said lever between said further inclines and adapted to move over same, and means yieldingly restraining relative movement between the smaller angle inclines and the cam-follower element moving between and over same.

References Cited in the file of this patent

UNITED STATES PATENTS

| | | |
|---|---|---|
| 547,644 | Krug | Oct. 8, 1898 |
| 1,116,838 | Oster et al. | Nov. 10, 1914 |
| 1,364,783 | Morgan | Jan. 4, 1921 |
| 1,906,424 | Schurr | Mar. 2, 1933 |
| 2,455,663 | Eaton | Dec. 7, 1948 |

FOREIGN PATENTS

| | | |
|---|---|---|
| 512,375 | France | Oct. 9, 1920 |
| 272,350 | Switzerland | Dec. 15, 1950 |